US011030102B2

(12) United States Patent
Kaushikkar et al.

(10) Patent No.: US 11,030,102 B2
(45) Date of Patent: Jun. 8, 2021

(54) REDUCING MEMORY CACHE CONTROL COMMAND HOPS ON A FABRIC

(71) Applicant: Apple Inc., Cupertino, CA (US)

(72) Inventors: Harshavardhan Kaushikkar, San Jose, CA (US); Rong Zhang Hu, Saratoga, CA (US); Xiaoming Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/125,438

(22) Filed: Sep. 7, 2018

(65) Prior Publication Data
US 2020/0081836 A1 Mar. 12, 2020

(51) Int. Cl.
*G06F 12/0815* (2016.01)
*G06F 12/0855* (2016.01)
(Continued)

(52) U.S. Cl.
CPC ...... *G06F 12/0815* (2013.01); *G06F 12/0855* (2013.01); *G06F 13/1668* (2013.01);
(Continued)

(58) Field of Classification Search
CPC .............. G06F 1/00–3296; G06F 3/00; G06F 3/06–0689; G06F 5/00–16;
(Continued)

(56) References Cited

U.S. PATENT DOCUMENTS

| 5,291,486 A | 3/1994 | Koyanagi |
| 6,014,690 A * | 1/2000 | VanDoren ........... G06F 12/0813 709/201 |

(Continued)

FOREIGN PATENT DOCUMENTS

WO    WO-2006063297 A1 *   6/2006   ......... G06F 13/4027

OTHER PUBLICATIONS

F. Verbeek, P. M. Yaghini, A. Eghbal and N. Bagherzadeh, "Deadlock Verification of Cache Coherence Protocols and Communication Fabrics," in IEEE Transactions on Computers, vol. 66, No. 2, pp. 272-284, Feb. 1, 2017 (Year: 2017).*

*Primary Examiner* — Daniel C. Chappell
(74) *Attorney, Agent, or Firm* — Kowert Hood Munyon Rankin and Goetzel PC; Rory D. Rankin (57) ABSTRACT

Systems, apparatuses, and methods for reducing memory cache control command hops through a fabric are disclosed. A system includes an interconnect fabric, a plurality of transaction processing queues, and a plurality of memory pipelines. Each memory pipeline includes an arbiter, a combined coherence point and memory cache controller unit, and a memory controller coupled to a memory channel. Each combined unit includes a memory cache controller, a memory cache, and a duplicate tag structure. A single arbiter per memory pipeline performs arbitration across the transaction processing queues to select a transaction address to feed the memory pipeline's combined unit. The combined unit performs coherence operations and a memory cache lookup for the selected transaction. Only after processing is completed in the combined unit is the transaction moved out of its transaction processing queue, reducing power consumption caused by data movement through the fabric.

20 Claims, 7 Drawing Sheets

(51) Int. Cl.
*G06F 13/16* (2006.01)
*G06F 13/40* (2006.01)

(52) U.S. Cl.
CPC ...... *G06F 13/4027* (2013.01); *G06F 13/4022* (2013.01); *G06F 2212/1024* (2013.01); *G06F 2212/608* (2013.01)

(58) Field of Classification Search
CPC ..... G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | |
|---|---|---|---|
| 6,259,693 B1 | 7/2001 | Ganmukhi et al. | |
| 6,347,349 B1 * | 2/2002 | Neal | G06F 13/4036 710/100 |
| 6,351,784 B1 * | 2/2002 | Neal | G06F 13/36 710/108 |
| 6,434,568 B1 * | 8/2002 | Bowman-Amuah | G06F 16/289 |
| 6,704,844 B2 | 3/2004 | Arimilli | G06F 12/0831 711/118 |
| 6,754,752 B2 * | 6/2004 | Marietta | G06F 12/0815 710/200 |
| 6,950,438 B1 | 9/2005 | Owen et al. | |
| 6,976,148 B2 * | 12/2005 | Arimilli | G06F 12/1027 711/207 |
| 7,047,320 B2 * | 5/2006 | Arimilli | G06F 12/0835 709/220 |
| 7,155,554 B2 * | 12/2006 | Vinogradov | G06F 13/4022 710/305 |
| 7,221,678 B1 | 5/2007 | Hughes | |
| 7,274,692 B1 | 9/2007 | Hughes | |
| 7,286,532 B1 | 10/2007 | Rachepalli et al. | |
| 7,376,765 B2 | 5/2008 | Rangan et al. | |
| 7,412,588 B2 | 8/2008 | Georgiou et al. | |
| 7,486,678 B1 | 2/2009 | Devanagondi et al. | |
| 7,643,334 B1 | 1/2010 | Lee et al. | |
| 7,774,374 B1 | 8/2010 | Kizhepat et al. | |
| 7,836,229 B1 | 11/2010 | Singh et al. | |
| 8,270,401 B1 | 9/2012 | Barnes et al. | |
| 8,392,575 B1 | 3/2013 | Marr | |
| 8,527,661 B1 | 9/2013 | Lee et al. | |
| 8,532,119 B2 | 9/2013 | Snively et al. | |
| 8,792,511 B2 | 7/2014 | Raikar et al. | |
| 9,176,877 B2 * | 11/2015 | Hollaway, Jr. | G06F 12/0811 |
| 9,191,139 B1 | 11/2015 | Venkata et al. | |
| 9,860,841 B2 | 1/2018 | Fukami et al. | |
| 2001/0025328 A1 * | 9/2001 | Marietta | G06F 12/0815 710/105 |
| 2002/0141427 A1 | 10/2002 | McAlpine | |
| 2006/0236037 A1 * | 10/2006 | Guthrie | G06F 12/0811 711/141 |
| 2007/0086428 A1 | 4/2007 | Lai et al. | |
| 2008/0080261 A1 | 4/2008 | Shaeffer et al. | |
| 2008/0147937 A1 | 6/2008 | Freimuth et al. | |
| 2008/0147938 A1 | 6/2008 | Freimuth et al. | |
| 2008/0147959 A1 | 6/2008 | Freimuth et al. | |
| 2008/0270708 A1 * | 10/2008 | Warner | G06F 12/082 711/146 |
| 2009/0094406 A1 | 4/2009 | Ashwood | |
| 2009/0187795 A1 | 7/2009 | Doverspike et al. | |
| 2010/0158005 A1 | 6/2010 | Mukhopadhyay et al. | |
| 2010/0162265 A1 | 6/2010 | Heddes | |
| 2010/0229005 A1 | 9/2010 | Herman et al. | |
| 2010/0262786 A1 * | 10/2010 | Cummings | G06F 12/0815 711/141 |
| 2011/0093687 A1 * | 4/2011 | Chen | G06F 12/0862 712/225 |
| 2011/0158247 A1 | 6/2011 | Toyoshima | |
| 2011/0249181 A1 | 10/2011 | Iwami et al. | |
| 2011/0252265 A1 | 10/2011 | Iwami et al. | |
| 2012/0044813 A1 | 2/2012 | Nandagopal et al. | |
| 2012/0144063 A1 | 6/2012 | Menchaca et al. | |
| 2012/0317362 A1 * | 12/2012 | Hendry | G06F 12/0831 711/130 |
| 2013/0028256 A1 | 1/2013 | Koren et al. | |
| 2013/0285998 A1 | 10/2013 | Hong et al. | |
| 2014/0108878 A1 * | 4/2014 | Liu | H04L 1/16 714/748 |
| 2014/0122771 A1 | 5/2014 | Chrysos et al. | |
| 2014/0310472 A1 * | 10/2014 | Hollaway, Jr. | G06F 12/0811 711/128 |
| 2014/0372607 A1 | 12/2014 | Gladwin et al. | |
| 2015/0227738 A1 | 8/2015 | Katoh | |
| 2016/0117179 A1 * | 4/2016 | Morton | G06F 9/44505 713/100 |
| 2016/0266898 A1 | 9/2016 | Kitamura | |
| 2016/0328348 A1 | 11/2016 | Iba et al. | |
| 2016/0380895 A1 | 12/2016 | Xiong et al. | |
| 2017/0052579 A1 * | 2/2017 | Abraham | G06F 1/266 |
| 2018/0150345 A1 * | 5/2018 | Porwal | G06F 11/0724 |
| 2018/0165107 A1 * | 6/2018 | Elzur | G06F 9/45558 |
| 2018/0165217 A1 * | 6/2018 | Greenspan | G06F 12/0815 |
| 2018/0341537 A1 * | 11/2018 | Panda | G06F 11/0787 |
| 2018/0349146 A1 * | 12/2018 | Iwamoto | G06F 9/4881 |
| 2019/0013965 A1 * | 1/2019 | Sindhu | G06F 13/4282 |
| 2019/0034363 A1 * | 1/2019 | Palermo | G06F 12/0875 |
| 2019/0042455 A1 * | 2/2019 | Agarwal | G06F 12/0891 |
| 2019/0155516 A1 * | 5/2019 | Bhargava | G06F 3/0689 |

* cited by examiner

REDUCING MEMORY CACHE CONTROL COMMAND HOPS ON A FABRIC

BACKGROUND

Technical Field

Embodiments described herein relate to computing systems, and more particularly, processing memory transactions.

Description of the Related Art

Integrated circuits (ICs) often include multiple circuits or agents that have a need to communicate with each other and/or access data stored in memory. In many cases, agents may communicate through various addresses defined in a common memory map or address space. In multiprocessor ICs, and even in single processor ICs in which other devices access main memory but do not access a given cache, the issue of cache coherence arises. That is, a given data producer can write a copy of data in the cache, and the update to main memory's copy is delayed. In write-through caches, a write operation is dispatched to memory in response to the write to the cache line, but the write is delayed in time. In a writeback cache, writes are made in the cache and not reflected in memory until the updated cache block is replaced in the cache (and is written back to main memory in response to the replacement).

Because the updates have not been made to main memory at the time the updates are made in cache, a given data consumer can read the copy of data in main memory and obtain "stale" data (data that has not yet been updated). A cached copy in a cache other than the one to which a data producer is coupled can also have stale data. Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches. Maintaining cache coherence is increasingly challenging as different agents are accessing the same regions of memory.

In addition to including logic for performing cache coherence operations, computing systems also include communication fabrics for routing transactions to and from memory. Many communication fabrics use a system of interconnected fabric units to arbitrate, aggregate, and/or route packets of messages between different processing elements. For example, some fabrics may use a hierarchical tree structure and process messages at each level in the tree. The processing performed at each level may include arbitration among packets from different processing elements, aggregating of packets belonging to the same message, operations to maintain memory coherence, etc. Communications fabrics are often used in system-on-a-chip (SoC) designs that are found in mobile devices such as cellular phones, wearable devices, etc., where power consumption is an important design concern.

SUMMARY

Systems, apparatuses, and methods for reducing memory cache control command hops on a fabric are contemplated.

In one embodiment, a computing system includes a communication fabric, a plurality of transaction processing queues, and a plurality of memory pipelines. Each memory pipeline includes an arbiter, a combined coherence point and memory cache controller unit, and a memory controller coupled to a memory channel. Each combined coherence point and memory cache controller unit includes a memory cache controller, a memory cache, and a duplicate tag structure. A memory transaction traveling upstream toward memory is received by the fabric and stored in a particular transaction processing queue which is determined by the agent which generated the transaction. A single arbiter per memory pipeline performs arbitration across the transaction processing queues to select a transaction to be forwarded to the memory pipeline's combined coherence point and memory cache controller unit. The combined coherence point and memory cache controller unit performs both coherence operations and a memory cache lookup. Only after processing is completed in the combined coherence point and memory cache controller unit is the transaction moved out of its transaction processing queue toward a destination processing element (e.g., a memory controller), helping to reduce power consumption related to data movement through the fabric. In various embodiments, the avoidance of transmitting the transaction through multiple hops within the fabric may reduce power consumption.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a communication fabric . . . " Such a claim does not foreclose the system from including additional components (e.g., a processor, a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

As used herein, a "memory transaction" or simply "transaction" refers to a command or request to read, write, or modify content (e.g., data or instructions) stored in a memory location corresponding to a particular address. In various embodiments, the address may be provided as a logical address, a physical address, or either. It is noted that throughout this disclosure, transactions may also be referred to as "memory requests", "memory access operations", or "memory operations", which are a type of instruction operation. In various embodiments, memory operations may be implicitly specified by an instruction having a memory operation, or may be derived from explicit load/store instructions.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Figure 1:
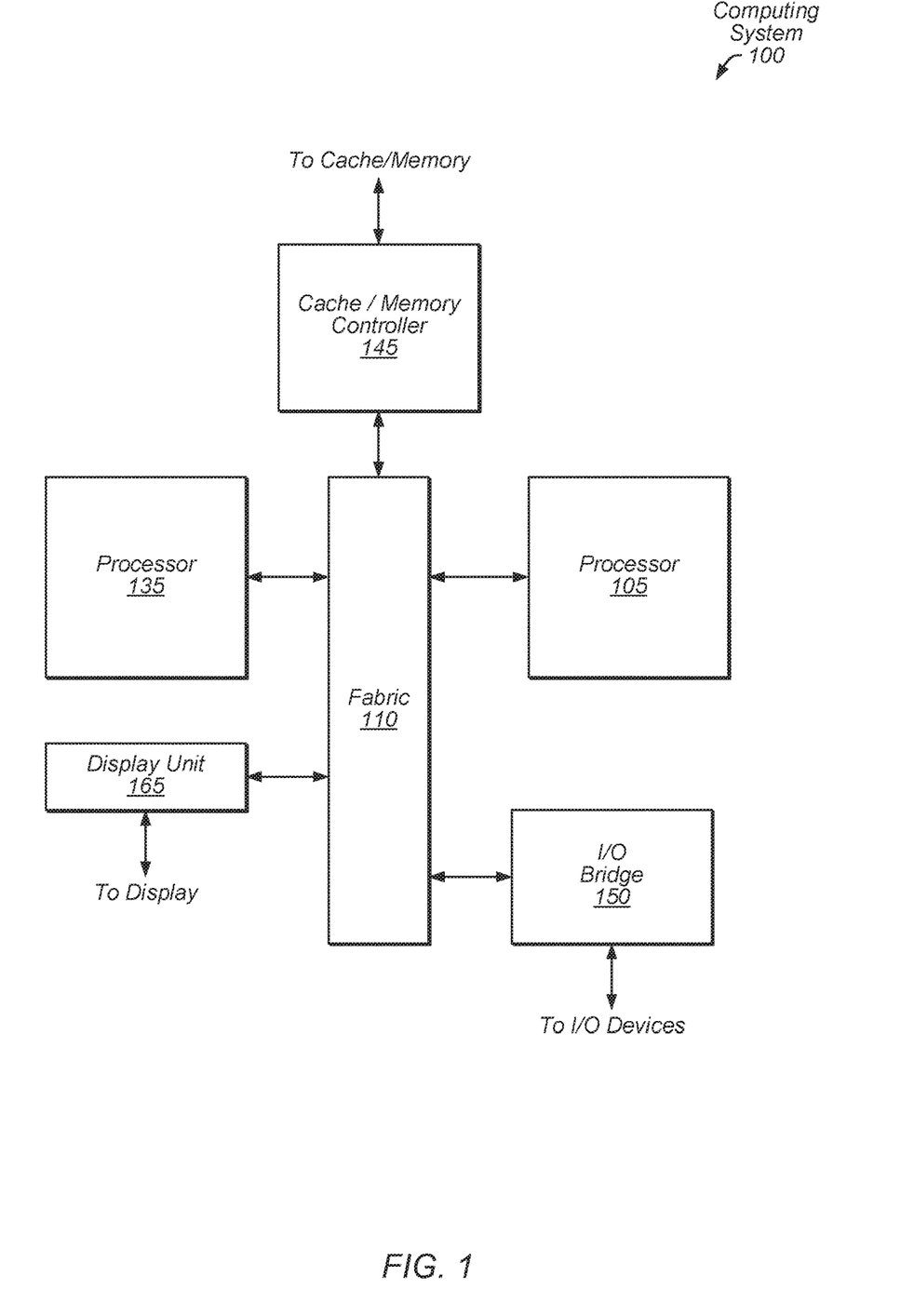
FIG. 1 is a block diagram illustrating one embodiment of a computing system.

Referring now to FIG. 1, a block diagram illustrating one embodiment of a computing system 100. In some embodiments, some or all elements of the computing system 100 may be included within an integrated circuit (IC) or a system on a chip (SoC). In some embodiments, computing system 100 may be included in a mobile device. In the illustrated embodiment, the computing system 100 includes fabric 110, processors 105 and 135, input/output (I/O) bridge 150, cache/memory controller 145, and display unit 165.

Fabric 110 may include various interconnects, buses, MUXes, controllers, etc., and may be configured to facilitate communication between various elements of computing system 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally.

Depending on the embodiment, each of processors 105 and 135 may include various numbers of cores and/or caches. For example, processors 105 and 135 may include 1, 2, or 4 processor cores, or any other suitable number. In some embodiments, processors 105 and 135 may include internal instruction and/or data caches. Processors 105 and 135 are coupled to fabric 110, and processors 105 and 135 may access system memory via cache/memory controller 145. In one embodiment, processor 105 and 135 are coherent agents of system 100. In some embodiments, a coherence unit (not shown) in fabric 110 or elsewhere in computing system 100 may be configured to maintain coherence between various caches of computing system 100. Processors 105 and 135 are configured to execute instructions of a particular instruction set architecture (ISA), which may include operating system instructions and user application instructions.

Cache/memory controller 145 may be configured to manage transfer of data between fabric 110 and one or more caches and/or memories (e.g., non-transitory computer readable mediums). For example, cache/memory controller 145 may be coupled to an L3 cache, which may, in turn, be coupled to a system memory. In other embodiments, cache/memory controller 145 may be directly coupled to a memory. In some embodiments, the cache/memory controller 145 may include one or more internal caches.

Display unit 165 may be configured to read data from a frame buffer and provide a stream of pixel values for display. Display unit 165 may be configured as a display pipeline in some embodiments. Furthermore, display unit 165 may include one or more interfaces (e.g., MIPI® or embedded display port (eDP)) for coupling to a user display (e.g., a touchscreen or an external display). I/O bridge 150 may include various elements configured to implement universal serial bus (USB) communications, security, audio, low-power always-on functionality, and/or other functions. I/O bridge 150 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 100 via I/O bridge 150. In some embodiments, central processing unit 105 may be coupled to computing system 100 via I/O bridge 150.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
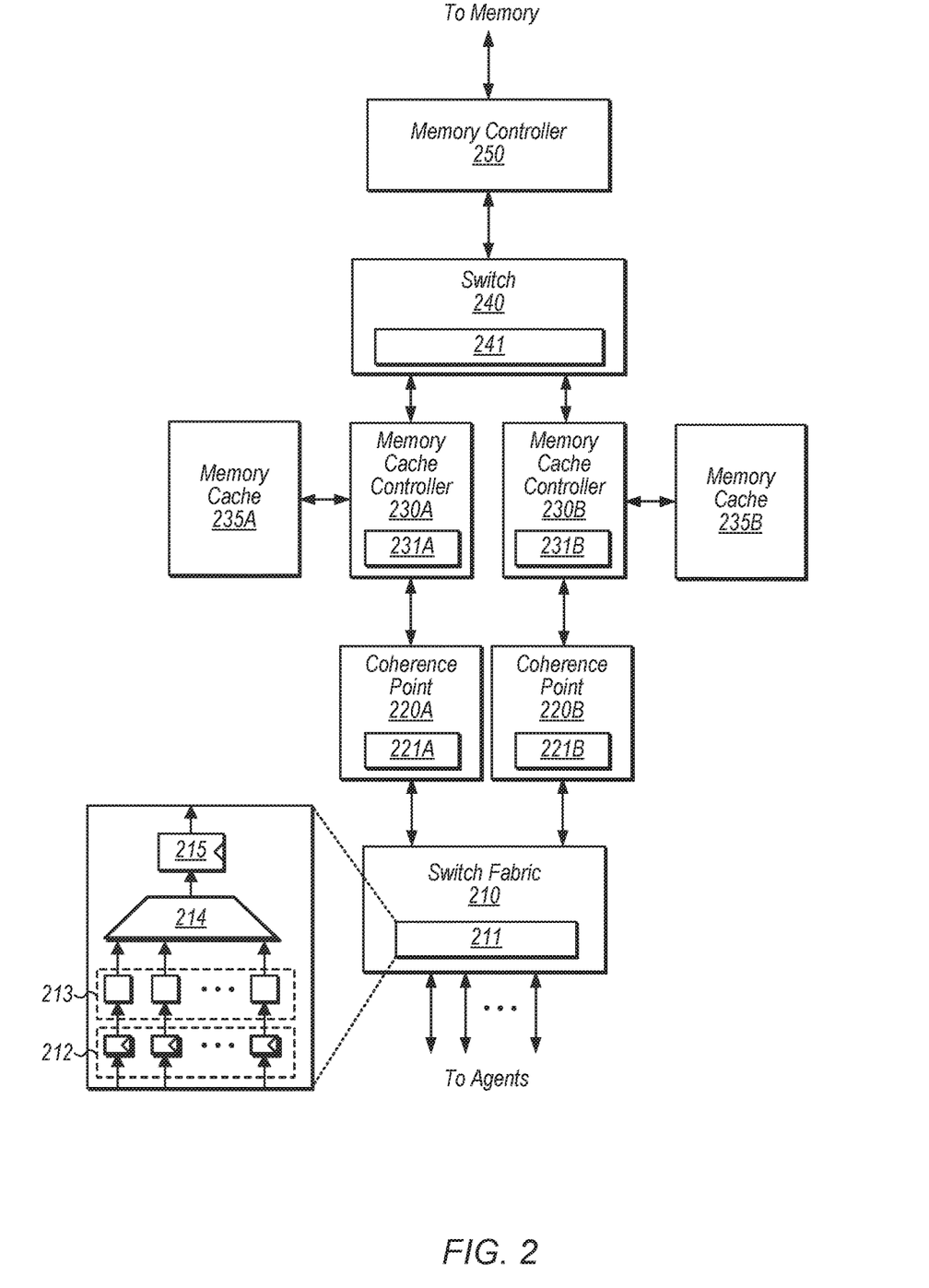
FIG. 2 is a block diagram of one embodiment of a fabric path to memory.

Turning now to FIG. 2, a block diagram of one embodiment of a fabric path to memory is shown. In one embodiment, the fabric path to memory is part of a computing system (e.g., computing system 100 of FIG. 1). The computing system has any number of functional units (i.e., agents) which are coupled to switch fabric 210. The number and type of functional units varies according to the embodiment. These functional units generate transactions which are conveyed to switch fabric 210 on any number of input legs. In one embodiment, switch fabric 210 includes queuing and arbitration circuitry 211. An expanded view of queuing and arbitration circuitry 211 is shown on the left-side of FIG. 2. For example, in one embodiment, queuing and arbitration circuitry 211 includes flops 212, queues 213, arbiter 214, and flops 215.

The transactions pass through switch fabric 210 to one of coherence points 220A-B. In one embodiment, the coherence point 220A-B which a transaction is sent to is based on an address of the transaction. In one embodiment, coherence points 220A-B include queuing and arbitration circuitry 221A-B, respectively. In one embodiment, each queuing and arbitration circuitry unit 221A-B includes the components shown in queuing and arbitration circuitry 211. In one embodiment, each of coherence points 220A-B performs various operations so as to maintain memory coherence among various cache and/or memory structures of the overall computing system. As used herein, the term "coherence point" is intended to be construed according to its well-known meaning, which includes a processing element configured to maintain cache coherence between caches and/or memories in a shared memory system. After coherence operations are performed by a given coherence point 220A-B for a transaction, the transaction is conveyed to a corresponding memory cache controller 230A-B. In one embodiment, memory cache controllers 230A-B include queuing and arbitration circuitry 231A-B, respectively. In one embodiment, each queuing and arbitration circuitry unit 231A-B includes the components shown in queuing and arbitration circuitry 211. In one embodiment, "coherence operations" are defined as performing lookups of a duplicate tag structure, generating and sending probes to one or more caches in the computer system to determine if the caches have a copy of a block of data and optionally to indicate the state into which the cache should place the block of data, processing responses to probes, and/or one or more other operations.

Some memory transactions may be fulfilled by accessing a main system memory or a storage device. In some computing systems, the amount of time required to read/write data from/to the main system memory or the storage device may be longer than an execution time of several processor instructions. To enable faster access to frequently accessed content, issued memory transactions are sent to a memory cache controller 230A-B which may provide faster fulfillment of the memory transactions by storing content from frequently accessed memory locations in a memory cache 235A-B, respectively, that can be read and written faster than the main system memory or the storage device. After receiving a memory transaction, memory cache controller 230A-B determines if an address included in the memory transaction corresponds to an address currently stored in memory cache 235A-B, respectively. If the corresponding address for the memory transaction is currently stored in memory cache 235A-B, then memory cache controller 230A-B performs the transaction on a cached copy of requested content. Otherwise, if the address included in the memory transaction is not currently stored in the cache memory, then memory cache controller 230A-B issues a command to retrieve data at the address included in the memory command. This command is conveyed to switch 240 and then to memory controller 250. In one embodiment, switch 240 includes queuing and arbitration circuitry 241. In one embodiment, queuing and arbitration circuitry 241 includes the components shown in queuing and arbitration circuitry 211. Memory controller 250 is representative of any number of memory controllers which are connected to memory device(s) (not shown) via any number of memory channels.

As can be seen from the arrangement of components of the fabric path to memory shown in FIG. 2, transactions generated by agents are required to traverse four logical blocks before reaching memory controller 250. Each logical block includes its own layer of queuing and arbitration circuitry through which transactions will traverse. This adds to the latency of processing the memory transactions and increases the power consumption of processing and conveying memory transactions to memory. In addition, the performance tunability suffers since each logical block has its own arbitration circuitry. With multiple layers of arbiters, later arbiters may sometimes try to reverse the decisions (i.e., change the ordering of transactions) that earlier arbiters made. The ability to finely tune the prioritization of transaction processing may be unattainable with multiple layers of arbiters making contradictory decisions.

When commands and data are moved between logical blocks, the commands and data typically traverse interface flops between the logical blocks. For example, queuing and arbitration circuitry 211 includes flops 212, and the other queuing and arbitration circuitry units 221A-B, 231A-B, and 241 include flops at the inputs to these units. These interface flops allow timing constraints to be met when the commands and data are sent in between different logical blocks. Within a logical block, there is typically storage for the commands and data to facilitate arbitration and/or to accommodate rate differences between ingress and egress. For example, queuing and arbitration circuitry 211 includes queues 213, and the other queuing and arbitration circuitry units 221A-B, 231A-B, and 241 also include queues for storing commands and data. The storage helps to address various issues between logical blocks, such as bandwidth mismatches, stalling due to lack of resources, coherence processing, and so on. These issues are addressed by implementing queuing and arbitration circuitry units 211, 221A-B, 231A-B, and 241 at the boundaries between logical blocks. The queues are typically made out of flops for the commands, and the queues typically have associated static random-access memories (SRAMs) for storage of data. Accordingly, moving one transaction through the fabric results in many flops being toggled at the boundaries of the logical blocks shown in FIG. 2. Consequently, reducing the number of command and data hops through the fabric will help lower power consumption. Additionally, reducing the number of arbitration points allows for an improved ability to tune performance by prioritizing some transactions relative to other transactions.

Figure 3:
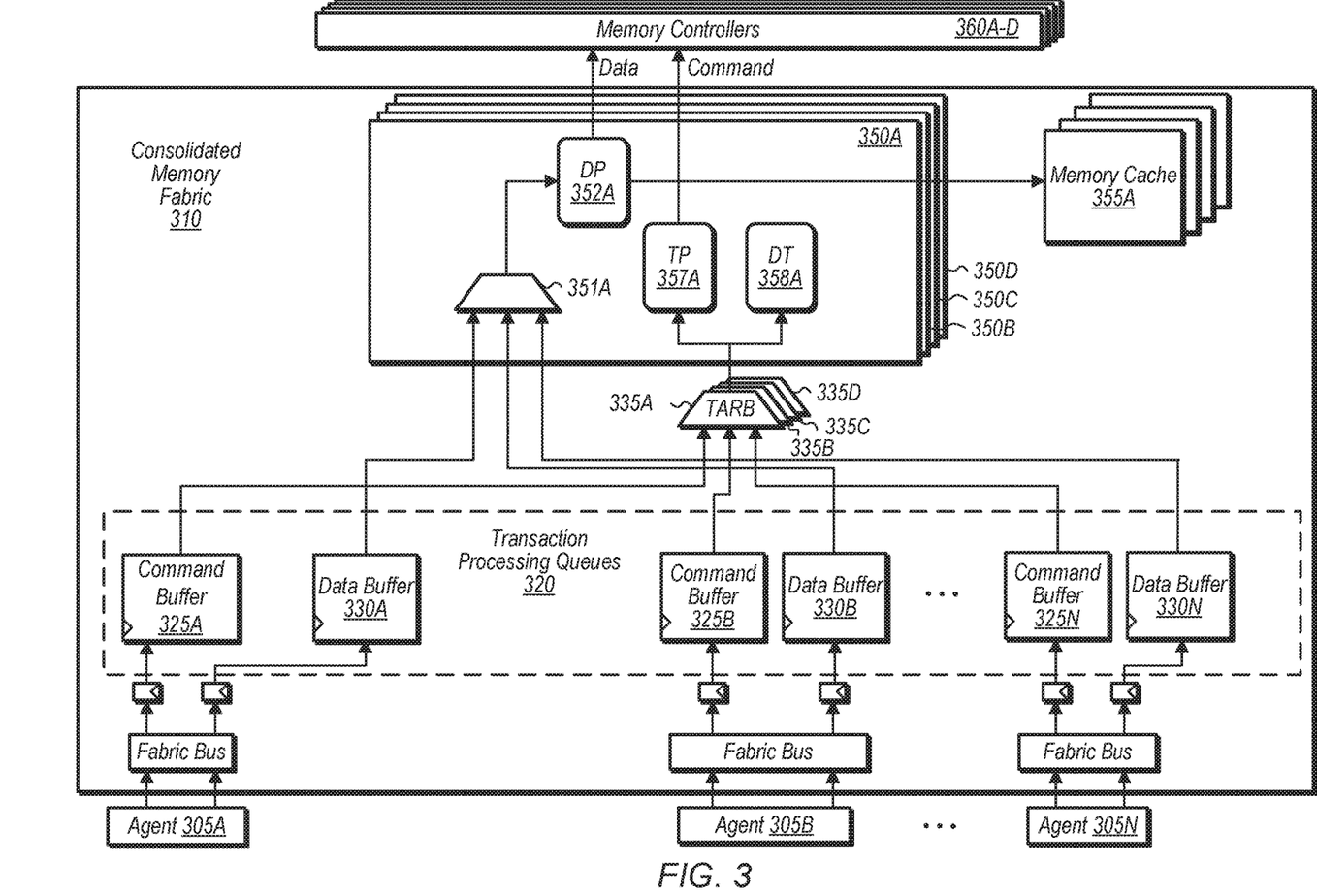
FIG. 3 is a block diagram of one embodiment of a consolidated memory fabric.

Referring now to FIG. 3, a block diagram of one embodiment of a consolidated memory fabric 310 is shown. In one embodiment, consolidated memory fabric 310 includes transaction processing queues 320, tag arbiters 335A-D, combined coherence point and memory cache controller units 350A-D, and memory caches 355A-D. Consolidated memory fabric 310 is coupled to agents 305A and memory controllers 360A-D. In other embodiments, consolidated memory fabric 310 includes other components and/or is arranged in other suitable manners. It is noted that "consolidated memory fabric" 310 may also be referred to as a "communication fabric" herein.

Agents 305A-N are representative of any number and type of agents. For example, in various embodiments, agents 305A-N include a CPU, a GPU, an I/O device, a system management unit, and/or other types of agents. Agents 305A-N send transactions upstream to memory through fabric bus components and flops to transaction processing queues 320. In one embodiment, there is a separate command buffer 325A-N and data buffer 330A-N pair for each agent 305A-N, respectively. In various embodiments, an entry in command buffers 325A-N may include a value representing a memory command, an address or addresses for the command (either logical or physical address), a value representing a priority of the transaction, a value representing an age or length of time since the transaction was issued, and/or any other suitable values that may be used in the processing of the transaction.

When a write transaction is conveyed to one of transaction processing queues 320, the command and data payloads are written to a corresponding command and data buffer pair. The command payload and the data payload of the write transaction are stored in corresponding buffers until all of the subsequent processing of consolidated memory fabric 310 is completed and a decision is made for how to process the write transaction. This helps to reduce the number of hops which the command payload and data payload are required to traverse on their way to their final destination.

In one embodiment, the memory of the overall computing system is divided into multiple memory pipelines (i.e., multiple distinct processing paths) such that each has its own memory controller and can be accessed independently of other memories. For example, in one embodiment, each memory and corresponding memory pipeline may be assigned a portion of an address space. Alternatively, a memory and corresponding memory pipeline may be assigned data based on load balancing or other considerations. In one embodiment, the memory pipeline that a transaction traverses is selected based on a hash function generated from at least a portion of the transaction address. In such an embodiment, some form of mapping between memories and address hashes may be maintained. In the embodiment shown in FIG. 3, computing system 300 includes four pipelines 350A-350D. However, it should be understood that in other embodiments, computing system 300 may include other numbers of memory pipelines.

In one embodiment, consolidated memory fabric 310 includes a common arbitration point represented by tag arbiters 335A-D. For each pipeline, a given tag arbiter 335A-D selects a transaction from transaction processing queues 320 to forward to a corresponding combined coherence point and memory cache controller unit 350A-D. It is noted that tag arbiters 335A-D arbitrate across all of the transaction processing queues 320. In other words, tag arbiters 335A-D represent a common arbitration point across all transaction processing queues 320.

Transaction processing queues 320 include any number of queues, with the number varying according to the embodiment. Each transaction processing queue 320 includes a command buffer 325A-N and data buffer 330A-N, respectively, with each buffer including a plurality of entries. As used herein, the term "queue" refers to a storage element having a plurality of entries. Queues are often used to store data (e.g., data associated with transactions) while waiting for processing resources to become available or for particular events to occur. In some embodiments, queues are used to store transactions in program order even though the transactions may be performed out of program order. Thus, queues do not always behave in a first-in-first-out (FIFO) manner. For example, if transactions arrive out of program order but are removed in program order, the transactions may not be dequeued (or retired) in the same order in which they are enqueued. As used herein, the term "storage element" refers to any element configured to store one or more values in a volatile or non-volatile manner. Examples of storage elements include registers, memories, latches, disks, etc.

Tag arbiters 335A-D perform arbitration and then determine which transaction is ready to be sent to combined coherence point and memory cache controller units 350A-D, respectively, for processing. It is noted that when the transaction is ready to be sent to a given combined coherence point and memory cache controller unit 350A-D for processing, the command payload and data payload remain in a given transaction processing queue 320. Only the relevant data is sent to the given combined coherence point and memory cache controller unit 350A-D for processing the transaction. In one embodiment, each combined coherence point and memory cache controller unit 350A-D has a single pipeline that handles both coherence operations and a memory cache lookup. It is noted that combined coherence point and memory cache controller units 350A-D may also be referred to as combined coherence point and memory cache controller pipelines, or pipelines for short. In one embodiment, each tag arbiter 335A-D feeds into (i.e., supplies) a single pipeline 350A-D per memory channel. Also, each pipeline 350A-D feeds into a respective memory channel.

In one embodiment, pipeline 350A includes multiplexer 351A, data path 352A, tag pipeline 357A, and duplicate tags 358A. The other combined coherence point and memory cache controller units 350B-D have similar circuitry. Multiplexer 351A feeds data path 352A with data from a corresponding data buffer 330A-N once the pipeline has finished processing the transaction. Tag pipeline 357A includes circuitry for performing a lookup of the tags of memory cache 355A while duplicate tag pipeline 358A includes circuitry for performing a duplicate tag lookup for coherence purposes. Memory cache 355A stores recently accessed data from memory for a first memory channel, while duplicate tag pipeline 358A include tags, corresponding to the first memory channel, of cache lines stored in other caches of the computing system. In one embodiment, the lookup of memory cache tags is performed in parallel with the lookup of duplicate tag pipeline 358A.

The architecture of consolidated memory fabric 310 is a consolidation, into a single logical block, of the entire hierarchy which was previously present in the switch fabric, coherence point, memory cache controller, and memory controller switch (shown in FIG. 2). Also, the processing of transactions performed by consolidated memory fabric 310 is uniform regardless of whether an operation is launched to read memory, whether an operation is launched into the memory cache 355, or whether a snoop operation is performed.

By consolidating the memory fabric hierarchy into one logical block, power consumption is reduced as commands and data traverse consolidated memory fabric 310. This also helps to minimize the queuing by merging the queuing functionality that was previously separated out in a sequential fashion across multiple logical blocks. This eliminates the need to move data between flop stages for interfaces and queuing structures for multiple logical blocks. Queues are consolidated and arbitration is also consolidated for consolidated memory fabric 310. By consolidating arbitration into a single arbitration point 335, the ability to tune performance is increased as compared to approaches with multiple layers of arbitration. Also, the number of interface pipe stages in consolidated memory fabric 310 are also reduced as compared to the architecture of FIG. 2. Additionally, the memory cache and coherence point functionality is combined into a common logical block.

Figure 4:
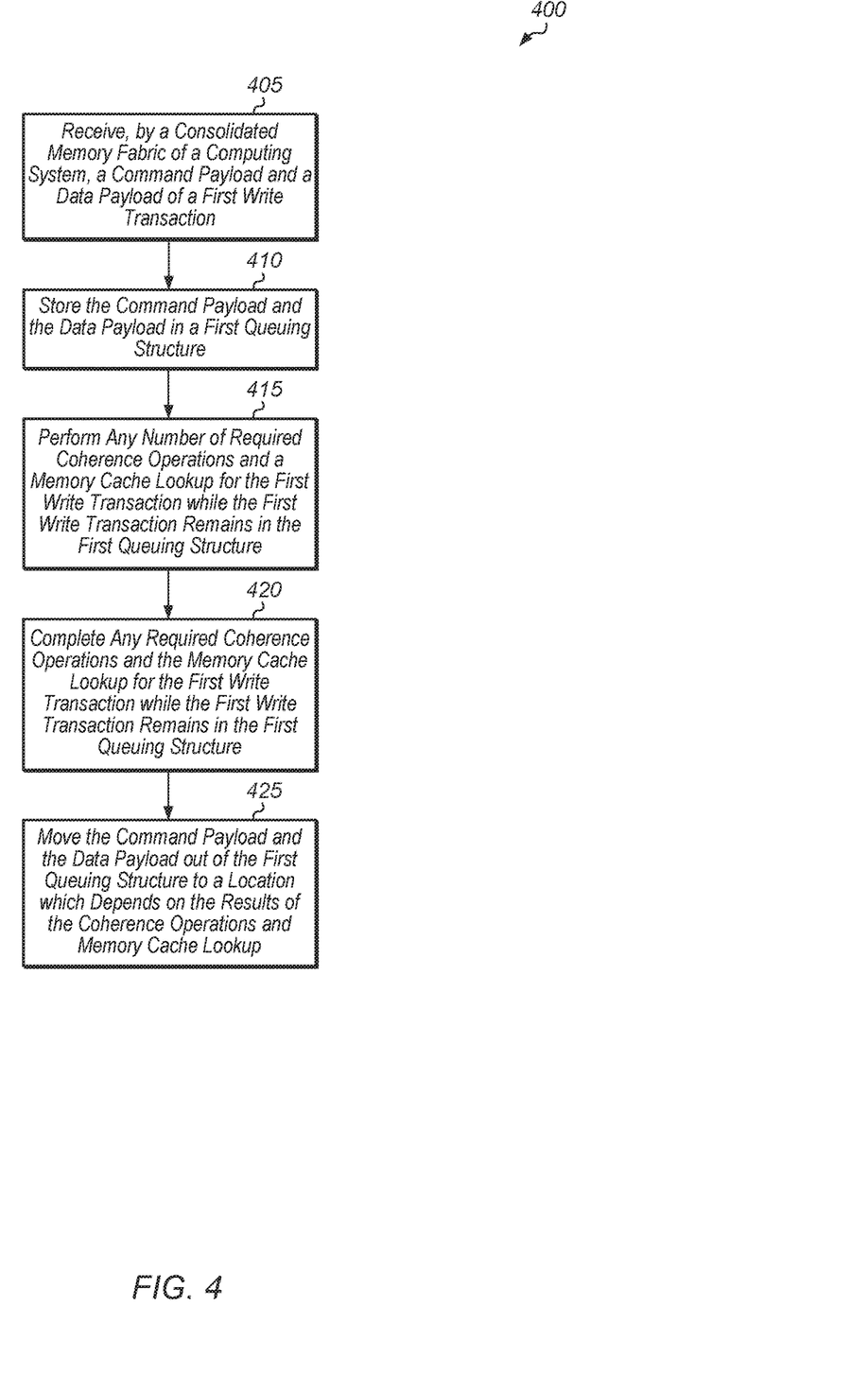
FIG. 4 is a generalized flow diagram illustrating one embodiment of a method for reducing hops for command and data through a consolidated memory fabric.

Turning now to FIG. 4, one embodiment of a method 400 for reducing hops for command and data through a memory fabric is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 400.

A consolidated memory fabric (e.g., consolidated memory fabric 310 of FIG. 3) of a computing system receives a command payload and a data payload of a first write transaction (block 405). In one embodiment, the consolidated memory fabric includes a combined coherence point and memory cache controller unit. It is assumed for the purposes of this discussion that the first transaction is traveling in an upstream direction toward memory.

In response to receiving the command and data payloads of the first transaction, the consolidated memory fabric stores the command payload and the data payload in a first queuing structure (block 410) In one embodiment, the first queuing structure (e.g., transaction processing queues 320) includes a queue for the command payload and an SRAM for the data payload. In other embodiments, the first queuing structure includes other types and/or arrangements of storage elements. Next, any number of required coherence operations and a memory cache lookup are performed for the first write transaction while the first write transaction remains in the first queuing structure (block 415). While the coherence operations and a memory cache lookup are performed for the first write transaction, one or more other transactions may be stored in the first queuing structure. For example, a second write transaction, a first read transaction, and/or other transactions may be stored in the first queuing structure while the first transaction remains in the first queuing structure. It is noted that the computing system may also include one or more other queuing structures in addition to the first queuing structure. For example, in one embodiment, each agent coupled to the consolidated memory fabric has a separate queuing structure for storing transactions traveling in an upstream direction.

After block 415, any required coherence operations and the memory cache lookup are completed for the first write transaction while the first write transaction remains in the first queuing structure (block 420). Next, in response to completing any required coherence operations and the memory cache lookup, the command payload and the data payload are moved out of the first queuing structure to a location which depends on the results of the coherence operations and memory cache lookup (block 425). The location to which the command and data payloads are forwarded may be the memory cache, memory, another coherent agent, or another unit or device. After block 425, method 400 ends. It is noted that method 400 may be performed for each write transaction that is traveling upstream toward memory.

Figure 5:
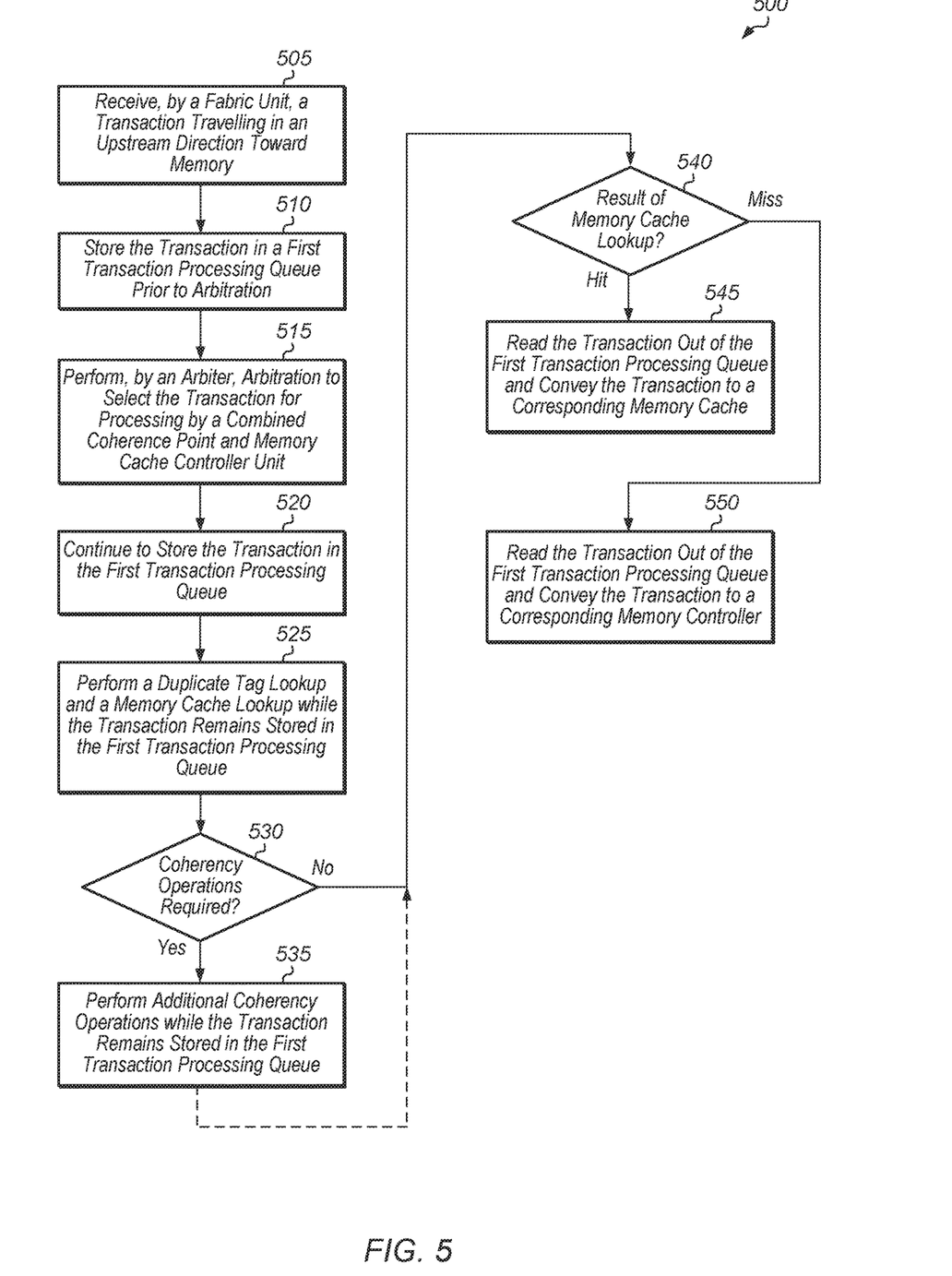
FIG. 5 is a generalized flow diagram illustrating one embodiment of a method for performing arbitration into a combined coherence point and memory cache controller unit.

Referring now to FIG. 5, one embodiment of a method 500 for performing arbitration into a combined coherence point and memory cache controller unit is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 500.

A fabric unit receives a transaction travelling in an upstream direction toward memory (block 505). It is noted that the "fabric unit" may also be referred to as a "communication fabric" or "consolidated memory fabric" herein. Next, the transaction is stored in a first transaction processing queue prior to arbitration (block 510). In one embodiment, the fabric unit includes a plurality of transaction processing queues, with a separate transaction processing queue for each agent of a plurality of agents coupled to the fabric unit. In this embodiment, the first transaction queue corresponds to a first agent which generated the transaction. If the transaction is a write transaction, then the command payload is stored in a command buffer and the data payload is stored in a data buffer. If the transaction is a read transaction, then the command payload is stored in the command buffer.

Next, while the transaction is stored in the first transaction processing queue, an arbiter performs arbitration to select the transaction for processing by a combined coherence point and memory cache controller unit (block 515). In one embodiment, the arbiter is part of a single arbitration point which performs arbitration for the combined coherence point and memory cache controller unit. The single arbitration point may actually have multiple separate arbiters corresponding to multiple memory pipelines. In one embodiment, the combined coherence point and memory cache controller unit includes multiple memory caches, and the memory cache which is looked up depends on a hash of the address of the transaction. Also, in this embodiment, the combined coherence point and memory cache controller unit includes multiple duplicate tag structures, with the specific duplicate tag structure which is looked up being dependent on a hash of the address of the transaction. In other embodiments, other techniques for determining which memory cache and/or duplicate tag structure to lookup are possible and are contemplated.

Then, after arbitration, the transaction continues to be stored in the first transaction processing queue (block 520). Also, after arbitration, a duplicate tag lookup and a memory cache lookup are performed by the combined coherence point and memory cache controller unit while the transaction remains stored in the first transaction processing queue (block 525). If additional coherence operations are required based on the results of the duplicate tag lookup (conditional block 530, "yes" leg), then the transaction remains stored in the first transaction processing queue while additional coherence operations are performed (block 535). Depending on the results of the coherence operations performed in block 535, method 500 optionally continues to conditional block 540. Alternatively, in some cases, depending on the results of the coherence operations performed in block 535, the transaction is read out of the first transaction processing queue and conveyed to another coherent agent within the system, and then method 500 ends.

If additional coherence operations are not required (conditional block 530, "no" leg), then if the memory cache lookup is a hit (conditional block 540, "hit" leg), then the transaction is read out of the first transaction processing queue and conveyed to a corresponding memory cache (block 545). If the memory cache lookup is a miss (conditional block 540, "miss" leg), then the transaction is read out of the first transaction processing queue and conveyed to a corresponding memory controller (block 550). After blocks 545 and 550, method 500 ends. It is noted that by keeping the transaction in the first transaction processing queue during arbitration, the duplicate tag lookup, optional coherence operations, and the memory cache lookup, multiple hops through the fabric are saved. By eliminating multiple hops through the fabric, power consumption is reduced.

Figure 6:
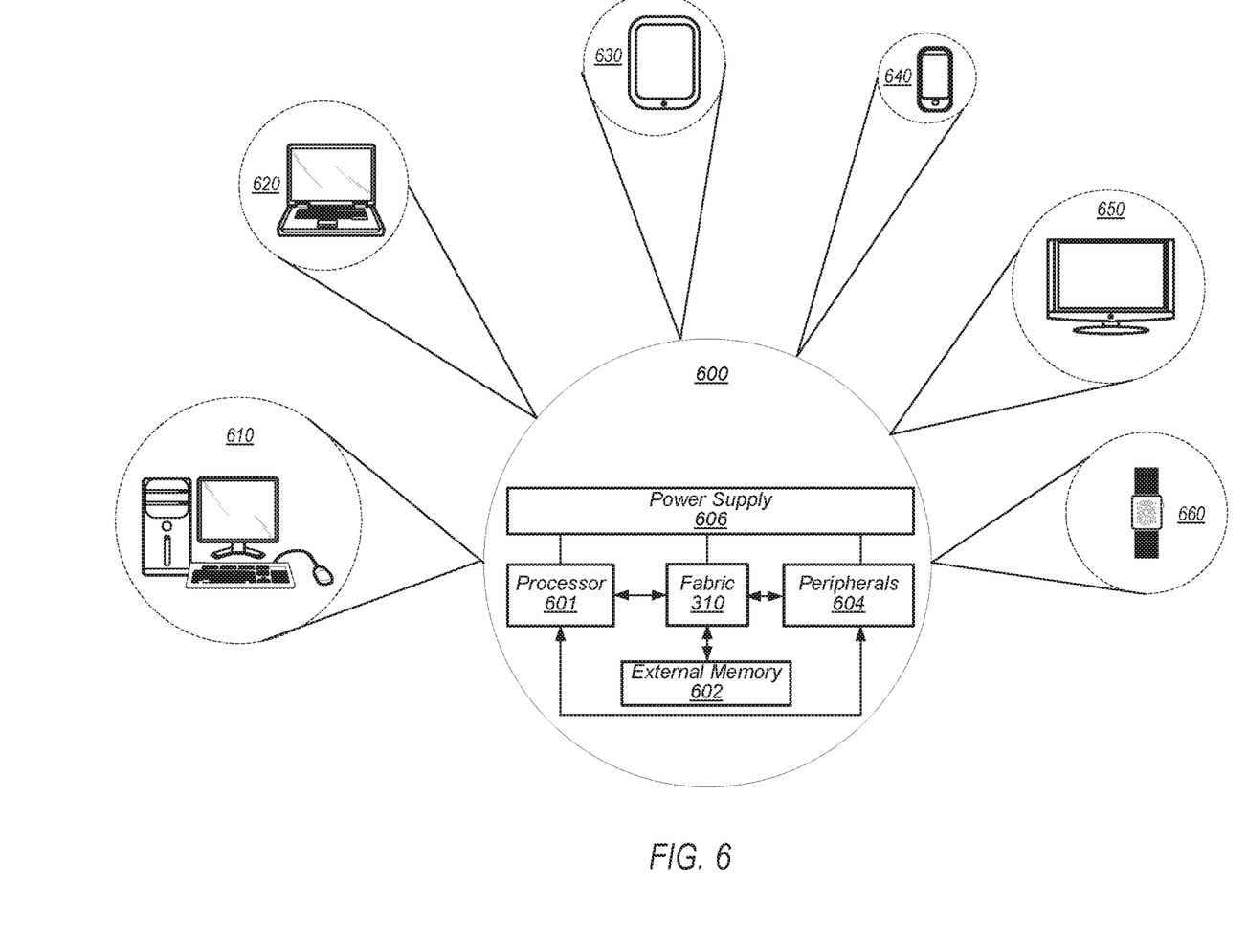
FIG. 6 is a block diagram of one embodiment of a system.

Turning next to FIG. 6, a block diagram of one embodiment of a system 600 is shown. As shown, system 600 may represent chip, circuitry, components, etc., of a desktop computer 610, laptop computer 620, tablet computer 630, cell or mobile phone 640, television 650 (or set top box configured to be coupled to a television), wrist watch or other wearable item 660, or otherwise. Other devices are possible and are contemplated. In the illustrated embodiment, the system 600 includes at least one instance of consolidated memory fabric 310 (of FIG. 3). In various embodiments, fabric 310 may be included within a system on chip (SoC) or integrated circuit (IC) which is coupled to processor 601, external memory 602, peripherals 604, and power supply 606.

Fabric 310 is coupled to processor 601, one or more peripherals 604, and the external memory 602. A power supply 606 is also provided which supplies the supply voltages to fabric 310 as well as one or more supply voltages to the processor 601, memory 602, and/or the peripherals 604. In various embodiments, power supply 606 may represent a battery (e.g., a rechargeable battery in a smart phone, laptop or tablet computer). In some embodiments, more than one instance of fabric 310 may be included (and more than one processor 601 and/or external memory 602 may be included as well).

The memory 602 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing fabric 310 in a chip-on-chip configuration, a package-on-package configuration, or a multi-chip module configuration.

The peripherals 604 may include any desired circuitry, depending on the type of system 600. For example, in one embodiment, peripherals 604 may include devices for various types of wireless communication, such as wifi, Bluetooth, cellular, global positioning system, etc. The peripherals 604 may also include additional storage, including RAM storage, solid state storage, or disk storage. The peripherals 604 may include user interface devices such as a display screen, including touch display screens or multi-touch display screens, keyboard or other input devices, microphones, speakers, etc.

Figure 7:
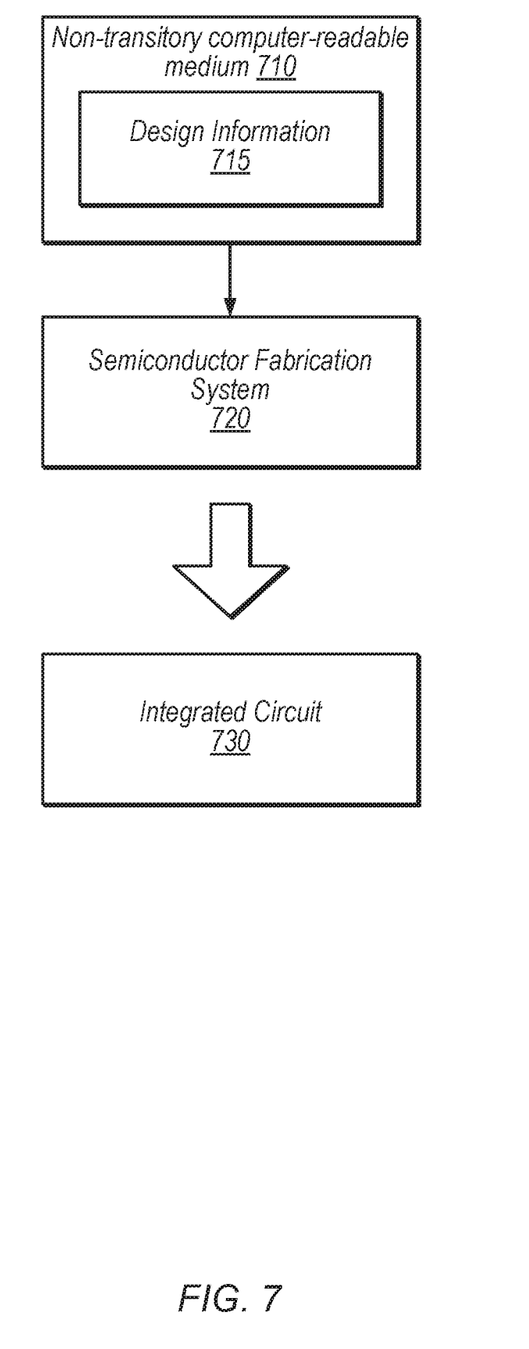
FIG. 7 is a block diagram illustrating an exemplary non-transitory computer-readable storage medium that stores circuit design information.

Referring now to FIG. 7, a block diagram illustrating an exemplary non-transitory computer-readable storage medium that stores circuit design information is shown. In the illustrated embodiment, semiconductor fabrication system 720 is configured to process the design information 715 stored on non-transitory computer-readable medium 710 and fabricate integrated circuit 730 based on the design information 715.

Non-transitory computer-readable medium 710 may comprise any of various appropriate types of memory devices or storage devices. Medium 710 may be an installation medium, (e.g., a CD-ROM, floppy disks, or tape device) a computer system memory or random access memory (e.g., DRAM, DDR RAM, SRAM, EDO RAM, Rambus RAM), a non-volatile memory (e.g., a Flash, magnetic media, a hard drive, optical storage), registers, or other similar types of memory elements. Medium 710 may include other types of non-transitory memory as well or combinations thereof. Medium 710 may include two or more memory mediums which may reside in different locations (e.g., in different computer systems that are connected over a network).

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1-3. Furthermore, integrated circuit 730 may be configured to perform various functions described herein in conjunction with other components. For example, integrated circuit 730 may be coupled to voltage supply circuitry that is configured to provide a supply voltage (e.g., as opposed to including a voltage supply itself). Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In various embodiments, program instructions of a software application are used to implement the methods and/or mechanisms described herein. For example, program instructions executable by a general or special purpose processor are contemplated. In various embodiments, such program instructions are represented by a high level programming language. In other embodiments, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (MDL) such as Verilog is used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of embodiments. Numerous variations and modifications will become apparent to those skilled in the art once the above disclosure is fully appreciated. It is intended that the following claims be interpreted to embrace all such variations and modifications.

What is claimed is:

1. A computing system comprising:
one or more processing units;
one or more memory controllers; and
a communication fabric distinct from the one or more processing units and the one or more memory controllers, wherein the communication fabric comprises a plurality of transaction processing queues, is coupled to the one or more processing units and the one or more memory controllers, and is configured to:
receive, from a first processing unit, a command payload and a data payload of a first write transaction;
store the command payload and the data payload in a given transaction processing queue of the plurality of transaction processing queues; and
prior to moving the command payload and the data payload out of the given transaction processing queue, complete, for the first write transaction:
coherence operations; and
a memory cache lookup of a memory cache accessed independently of the one or more processing units and the one or more memory controllers.

2. The computing system as recited in claim 1, wherein the communication fabric comprises:
one or more pipelines, wherein each pipeline of the one or more pipelines is configured to:
perform coherence operations; and
perform a lookup of a corresponding memory cache; and
one or more arbiters, wherein a given arbiter of the one or more arbiters is configured to select the first write transaction for arbitration and forward an address of the first write transaction to a given pipeline of the one or more pipelines.

3. The computing system as recited in claim 2, wherein each arbiter of the one or more arbiters is configured to supply transactions to one pipeline per memory channel.

4. The computing system as recited in claim 3, wherein each arbiter is configured to select, from transactions in a plurality of transaction processing queues, transactions for processing by a given pipeline.

5. The computing system as recited in claim 4, wherein there is a single arbiter between the given transaction processing queue and a given memory controller for the first write transaction.

6. The computing system as recited in claim 2, wherein the communication fabric further comprises a duplicate tag structure per pipeline, and wherein the communication fabric is configured to convey the data payload from the given transaction processing queue to a memory controller responsive to a memory cache lookup for the first write transaction missing and responsive to a tag lookup of a duplicate tag structure missing.

7. The computing system as recited in claim 1, wherein the communication fabric is further configured to perform the memory cache lookup by searching one or more address tags stored in the memory cache located between a coherence point and a system memory.

8. A method comprising:
receiving, by a communication fabric from a first processing unit, a command payload and a data payload of a first write transaction, wherein the communication fabric is distinct from the one or more processing units and the one or more memory controllers;
storing, in a given transaction processing queue of the communication fabric, the command payload and the data payload; and
prior to moving the command payload and the data payload out of the given transaction processing queue, completing, for the first write transaction:
coherence operations; and
a memory cache lookup of a memory cache accessed independently of the one or more processing units and the one or more memory controllers.

9. The method as recited in claim 8, further comprising:
forwarding, by a given arbiter, an address of the first write transaction to a given pipeline while the command payload and the data payload remain in the given transaction processing queue; and performing, by the given pipeline, coherence operations and a lookup of a corresponding memory cache while the command payload and the data payload remain in the given transaction processing queue.

10. The method as recited in claim 9, further comprising supplying, by each arbiter of one or more arbiters, transactions to one pipeline per memory channel.

11. The method as recited in claim 10, further comprising selecting, from transactions in a plurality of transaction processing queues, transactions for processing by a pipeline.

12. The method as recited in claim 11, further comprising traversing, by the first write transaction, a single arbiter in between the given transaction processing queue and a given memory controller.

13. The method as recited in claim 9, further comprising conveying the data payload from the given transaction processing queue to the given memory controller responsive to a memory cache lookup for the first write transaction missing and responsive to a tag lookup of a duplicate tag structure missing.

14. The method as recited in claim 8, further comprising searching one or more address tags stored in a memory cache located between a coherence point and a system memory to perform the memory cache lookup.

15. An apparatus comprising:
one or more functional units; and
a communication fabric distinct from the one or more functional units, wherein the communication fabric comprises a plurality of transaction processing queues, is coupled to the one or more functional units, and comprises circuitry configured to:
receive, from a first processing unit, a command payload and a data payload of a first write transaction;
store the command payload and the data payload in a given transaction processing queue of the plurality of transaction processing queues; and
prior to moving the command payload and the data payload out of the given transaction processing queue, complete, for the first write transaction:
coherence operations; and
a memory cache lookup of a memory cache accessed independently of the one or more processing units and the one or more memory controllers.

16. The apparatus as recited in claim 15, wherein the communication fabric comprises an arbiter which is configured to select the first write transaction for arbitration and forward an address of the first write transaction to a given pipeline for performing coherence operations and a lookup of a corresponding memory cache.

17. The apparatus as recited in claim 16, wherein the arbiter is configured to supply transactions to one pipeline per memory channel.

18. The apparatus as recited in claim 17, wherein the arbiter is further configured to select, from transactions in a plurality of transaction processing queues, transactions for processing by a given pipeline.

19. The apparatus as recited in claim 16, wherein the communication fabric comprises a duplicate tag structure per pipeline, and wherein each pipeline is configured to perform a duplicate tag lookup while the command payload and the data payload remain in the given transaction processing queue.

20. The apparatus as recited in claim 15, wherein the communication fabric is further configured to perform the memory cache lookup by searching one or more address tags stored in a memory cache located between a coherence point and a system memory.

* * * * *